(12) United States Patent
Yoda (10) Patent No.: US 9,151,775 B2
(45) Date of Patent: Oct. 6, 2015

(54) PHYSICAL QUANTITY SENSOR AND ELECTRONIC APPARATUS

(75) Inventor: Mitsuhiro Yoda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 13/569,580

(22) Filed: Aug. 8, 2012

(65) Prior Publication Data

US 2013/0042684 A1 Feb. 21, 2013

(30) Foreign Application Priority Data

Aug. 17, 2011 (JP) ................................. 2011-178252

(51) Int. Cl.
*G01P 15/02* (2013.01)
*G01P 15/125* (2006.01)
*G01P 15/08* (2006.01)

(52) U.S. Cl.
CPC ....... *G01P 15/125* (2013.01); *G01P 2015/0831* (2013.01)

(58) Field of Classification Search
USPC ................ 73/514.01, 514.32, 514.36, 514.37
See application file for complete search history.

(56) References Cited

U.S. PATENT DOCUMENTS

| | | | | |
|---|---|---|---|---|
| 5,313,835 A * | 5/1994 | Dunn | .......................... | 73/514.15 |
| 5,405,749 A | 4/1995 | Polans et al. | | |
| 5,488,864 A | 2/1996 | Stephan | | |
| 5,581,035 A * | 12/1996 | Greiff | ........................ | 73/514.32 |
| 5,905,203 A * | 5/1999 | Flach et al. | ................. | 73/514.32 |
| 6,513,380 B2 | 2/2003 | Reeds, III et al. | | |
| 6,631,641 B1 * | 10/2003 | Schalk et al. | ............... | 73/504.03 |
| 7,022,543 B2 * | 4/2006 | Eskridge et al. | ................. | 438/52 |
| 7,121,141 B2 * | 10/2006 | McNeil | ....................... | 73/514.32 |
| 7,146,856 B2 * | 12/2006 | Malametz | .................. | 73/514.32 |
| 8,079,262 B2 | 12/2011 | Guo | | |
| 8,402,826 B2 * | 3/2013 | Classen et al. | ............. | 73/514.32 |
| 8,746,066 B2 * | 6/2014 | Classen et al. | ............. | 73/514.13 |
| 2004/0160232 A1 * | 8/2004 | Yue et al. | ....................... | 324/660 |
| 2005/0109109 A1 | 5/2005 | Eskridge et al. | | |
| 2010/0122578 A1 * | 5/2010 | Classen | ...................... | 73/514.32 |
| 2012/0204642 A1 * | 8/2012 | McNeil et al. | ............. | 73/514.32 |

FOREIGN PATENT DOCUMENTS

| | | |
|---|---|---|
| JP | 06-308152 | 11/1994 |
| JP | 09-189716 | 7/1997 |
| JP | 2009-109494 | 5/2009 |
| JP | 2010-281789 A | 12/2010 |

* cited by examiner

*Primary Examiner* — Hezron E Williams
*Assistant Examiner* — Xin Zhong
(74) *Attorney, Agent, or Firm* — Harness, Dickey & Pierce, P.L.C.

(57) ABSTRACT

An acceleration sensor includes a base substrate provided with a first recess part, and a sensor part located on the first recess part and swingably supported in a depth direction of the first recess part by a support part, wherein the sensor part is sectioned into a first part and a second part by the support part, includes a movable electrode part in the first part and the second part, a through hole is provided at least at an end side in the second part larger in mass than the first part, and the base substrate includes a fixed electrode part in a position opposed to the movable electrode part in the first recessed part, and a second recess part deeper than the first recess part is provided in a position opposed to the end side of the sensor part.

6 Claims, 6 Drawing Sheets

PHYSICAL QUANTITY SENSOR AND ELECTRONIC APPARATUS

BACKGROUND

1. Technical Field

The present invention relates to a physical quantity sensor and an electronic apparatus including the physical quantity sensor.

2. Related Art

In related art, as a physical quantity sensor, an electrostatic capacitance sensor in which a structure having a movable electrode supported by a fixed part via an elastic element such as a torsion spring is formed, the movable electrode moves close to or away from a fixed electrode in response to an acting external force or the like, and thereby, various physical quantities such as acceleration, angular velocities, or the like may be detected by detecting the change in electrostatic capacitance between the electrodes has been known.

As the electrostatic capacitance sensor, an ultracompact mechanical acceleration sensor adapted to detect a physical quantity in a vertical axis direction by a swing stage (mass part) swingably supported by a torsion rod (torsion spring) in a hollow space between two semiconductor wafers and swinging (displaced) like a seesaw due to an applied physical quantity such as acceleration has been disclosed (for example, see Patent Document 1 (JP-A-9-189716)).

The ultracompact mechanical acceleration sensor (hereinafter, referred to as "acceleration sensor") in Patent Document 1 is the electrostatic capacitance sensor. Thereby, in the acceleration sensor, from the following general expression (1) of the electrostatic capacitance, in order to increase detection sensitivity, for example, the swing stage as a movable electrode and a first electrode as a fixed electrode opposed to the swing stage are made closer to increase the electrostatic capacitance so that the electrostatic capacitance may change to an appreciable extent for small displacement of the swing stage and small acceleration may be detected.

$$C = \epsilon S/d \tag{1}$$

(an electrostatic capacitance is C, an area of an opposed electrode is S, a distance between the opposed electrodes is d, permittivity is $\epsilon$)

However, in the acceleration sensor, a surface of a first semiconductor wafer with the first electrode (fixed electrode) formed thereon is flat and the swing stage is formed like a flat plate.

Accordingly, in the acceleration sensor, for example, when the swing stage is displaced due to inertia force of the applied acceleration, the displacement may be suppressed by fluid resistance (squeeze film damping) of a gas existing between the swing stage and the surface of the first semiconductor wafer, and response may be slower and a detection range may be narrower.

Further, in the acceleration sensor, the swing stage may be stuck to the surface of the first semiconductor wafer due to charging caused by static electricity.

SUMMARY

An advantage of some aspects of the invention is to solve at least a part of the problems described above, and the invention can be implemented as the following embodiments or application examples.

Application Example 1

A physical quantity sensor according to this application example includes a base substrate provided with a first recess part, and a sensor part located on the first recess part and swingably supported in a depth direction of the first recess part by a support part extending in a direction of a first axis, wherein the sensor part is sectioned into a first part and a second part by the support part, includes a movable electrode part in the first part and the second part, the second part is larger in mass than the first part, and a through hole is provided at least in one of the first part and the second part, and the base substrate includes a fixed electrode part in a position overlapping with the movable electrode part in a plan view, and a second recess part deeper than the first recess part is provided in a position overlapping with an end of the sensor part in the plan view.

According to the configuration, in the physical quantity sensor, the through hole is provided at the end side of the second part of the sensor part, and the second recess part deeper than the first recess part is provided in a part opposed to the end side of the second part of the sensor part in the base substrate.

Thereby, in the physical quantity sensor, for example, when the second part of the sensor part swings (is displaced) in a direction closer to a bottom surface of the first recess part around the support part (rotation center) due to inertia force of applied acceleration, flow resistance of a gas existing between the second part of the sensor part and the bottom surface of the first recess part may be reduced compared to the case without the through hole or the second recess part.

As a result, in the physical quantity sensor, for example, displacement of the sensor part by application of acceleration becomes smoother, and thus, response becomes faster and a detection range may be made broader.

Further, in the physical quantity sensor, the mass of the second part of the sensor part is larger (heavier) than that of the first part, and thus, the sensor part is not balanced between the first part and the second part, and, for example, the sensor part may be efficiently displaced (rotated) in response to the acceleration applied to the sensor part.

As a result, in the physical quantity sensor, detection sensitivity at application of acceleration may be further improved.

Application Example 2

In the physical quantity sensor according to the application example, it is preferable that a conducting part is provided within the second recess part, and the conducting part is connected to the movable electrode part.

According to the configuration, in the physical quantity sensor, the conducting part is provided within the second recess part and the conducting part and the movable electrode part are connected, and thus, for example, charge generated when the sensor part is processed by reactive ion etching or the like may be let out from the base substrate side to the sensor substrate side via the conducting part.

As a result, in the physical quantity sensor, sticking of the sensor part to the base substrate due to charging may be avoided.

Application Example 3

In the physical quantity sensor according to the application example, it is preferable that a plurality of the through holes are provided along the direction of the first axis.

According to the configuration, in the physical quantity sensor, the plural through holes are arranged in strip shapes in the direction of the first axis, and thus, compared to other shapes, internal spaces of the respective through holes may be made larger while the mass of the sensor part is secured.

As a result, in the physical quantity sensor, flow resistance of a gas existing between the second part of the sensor part and a bottom surface of the second recess part may be further reduced.

Therefore, in the physical quantity sensor, for example, the displacement of the sensor part by application of acceleration becomes even smoother, and thus, the response becomes faster and the detection range may be further improved.

Application Example 4

In the physical quantity sensor according to the application example, it is preferable that the first recess part is provided so that an air gap between the sensor part and itself may be larger from the support part of the sensor part toward the end.

According to the configuration, in the physical quantity sensor, the first recess part is provided so that the air gap between the sensor part and itself may be larger from the support part side of the sensor part toward the end side, and thus, at the support part side with the smaller displacement of the sensor part, the air gap between the bottom surface of the first recess part and the sensor part may be made smaller and, at the end side with the larger displacement of the sensor part, the air gap between the bottom surface of the first recess part and the sensor part may be made larger.

As a result, in the physical quantity sensor, the detection sensitivity may be improved than in the case where the bottom surface of the first recess part is formed by a flat surface with reference to the air gap between the end side with the larger displacement of the sensor part and itself.

Application Example 5

In the physical quantity sensor according to the application example, it is preferable that an insulating material is used for the base substrate, and a semiconductor material is used for the sensor part.

According to the configuration, in the physical quantity sensor, the insulating material is used for the base substrate and the semiconductor material is used for the sensor part, and thus, insulation and isolation between the base substrate and the sensor part may be easily performed by the insulating material.

In addition, in the physical quantity sensor, by using low-resistance silicon, for example, as the semiconductor material for the sensor part, the sensor part and the movable electrode part may be integrated.

Thereby, in the physical quantity sensor, the movable electrode part may be easily provided in the sensor part.

Application Example 6

An electronic apparatus according to the application example includes the physical quantity sensor according to any one of the application examples.

Accordingly, the electronic apparatus having the configuration includes the physical quantity sensor according to any one of the application examples, and thus, the electronic apparatus that exerts the effects according to any one of the application examples may be provided.

BRIEF DESCRIPTION OF THE DRAWINGS

The invention will be described with reference to the accompanying drawings, wherein like numbers reference like elements.

FIGS. 2A and 2B are schematic plan and sectional views of the acceleration sensor in FIG. 1, and FIG. 2A is a plan view and FIG. 2B is a sectional view along an A-A line in FIG. 2A.

FIGS. 4A and 4B are schematic sectional views for explanation of sticking of a sensor part.

FIGS. 5A and 5B are schematic plan and sectional views showing a general configuration of an acceleration sensor of a second embodiment, and FIG. 5A is a plan view and FIG. 5B is a sectional view along an A-A line in FIG. 5A.

DESCRIPTION OF EXEMPLARY EMBODIMENTS

As below, embodiments of the invention will be explained with reference to the drawings. In the following respective drawings, for convenience of explanation, dimension ratios of the respective component elements are different from actual dimension ratios.

First Embodiment

First, an acceleration sensor as an example of a physical quantity sensor according to a first embodiment will be explained. The acceleration sensor may detect acceleration in a Z-axis direction (thickness direction).

Figure 1:
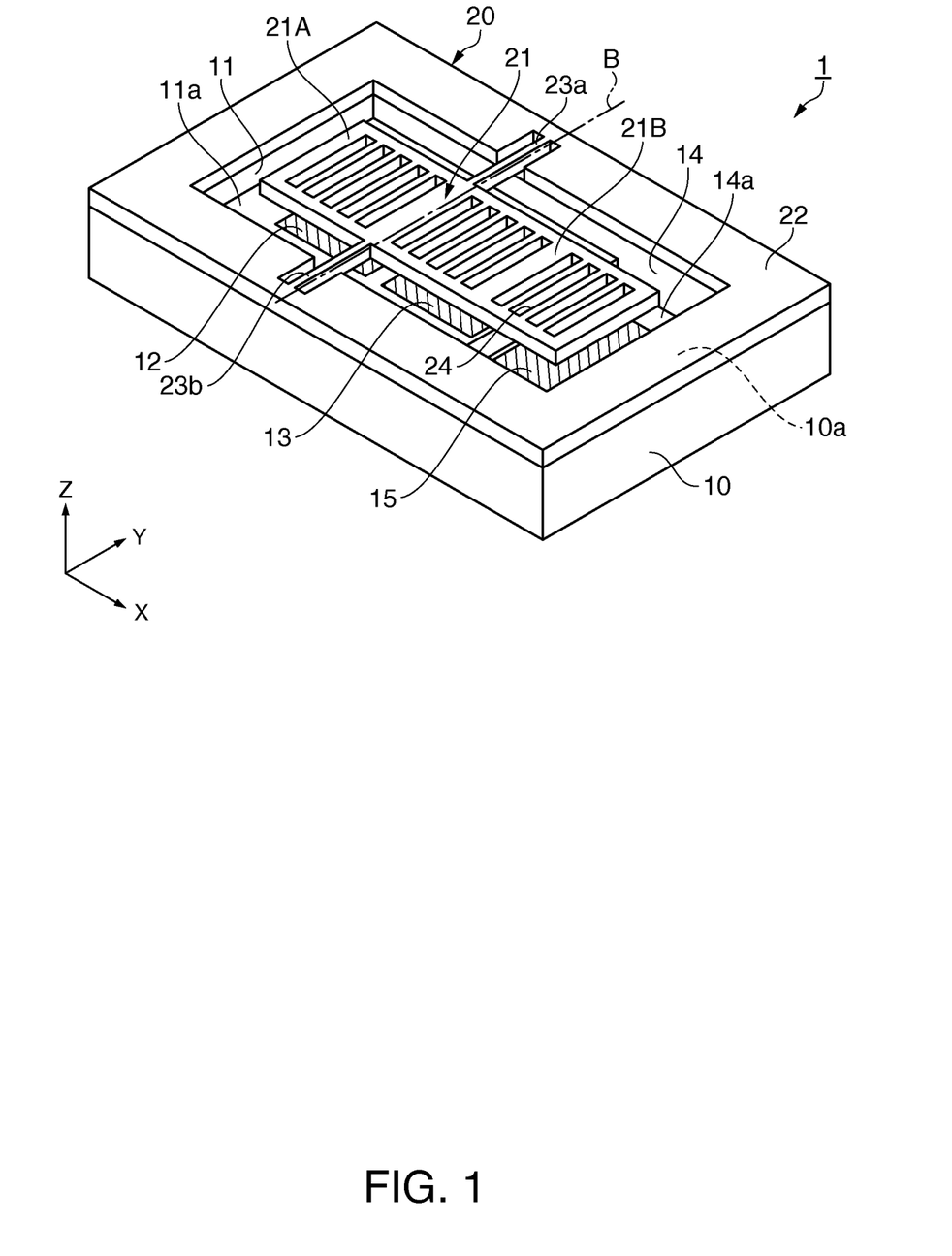
FIG. 1 is a schematic perspective view showing a general configuration of an acceleration sensor of a first embodiment.
Figure 2A:
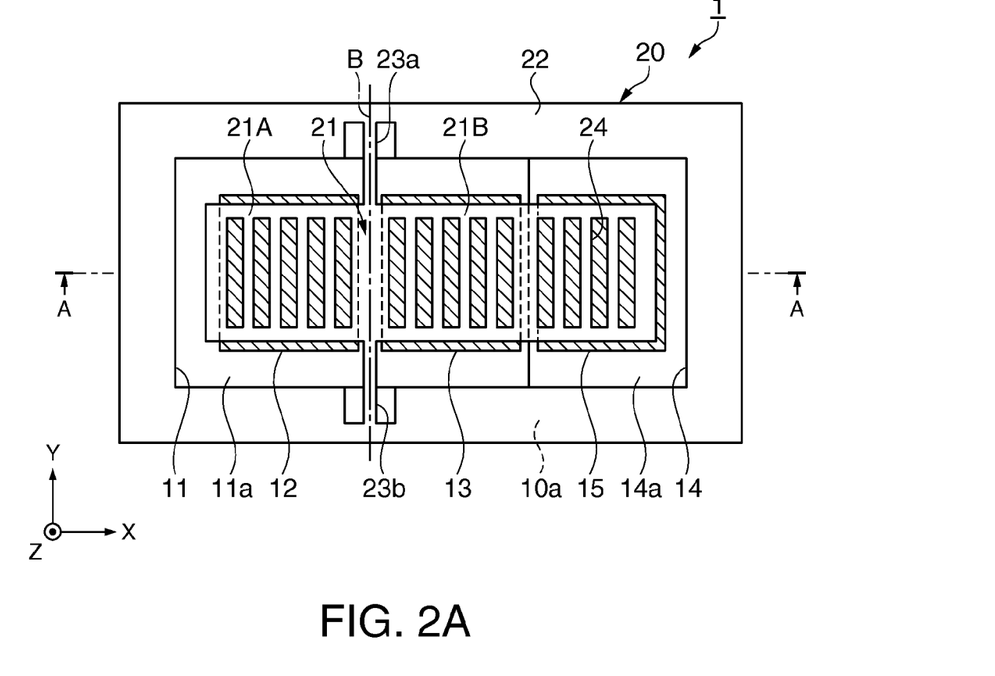
Figure 2B:
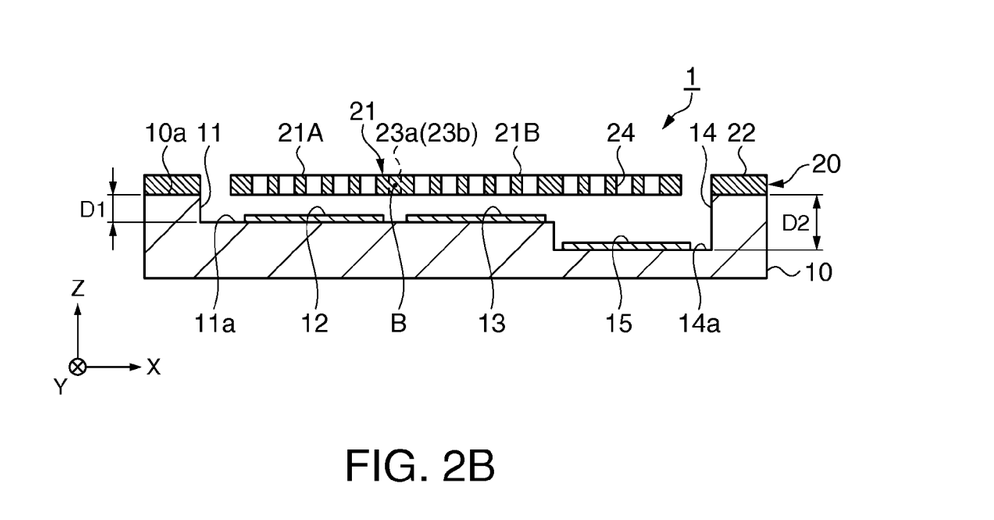

FIG. 1 is a schematic perspective view showing a general configuration of the acceleration sensor of the first embodiment. FIGS. 2A and 2B are schematic plan and sectional views of the acceleration sensor in FIG. 1, and FIG. 2A is a plan view and FIG. 2B is a sectional view along an A-A line in FIG. 2A.

As shown in FIGS. 1, 2A, and 2B, an acceleration sensor 1 includes a base substrate 10 and a sensor substrate 20.

The base substrate 10 has a nearly rectangular planar shape, and a first recess part 11 having a nearly rectangular planar shape is provided in a center part. It is preferable that an insulating material such as glass is used for the base substrate 10. For example, for the base substrate 10, glass containing alkali metal ions (movable ions) (for example, borosilicate glass such as Pyrex (registered trademark) glass) is preferably used.

Note that, for the base substrate 10, a high-resistance silicon material may be used.

The sensor substrate 20 has a nearly rectangular planar shape, and is bonded to a principal surface 10a on which the first recess part 11 of the base substrate 10 is provided.

The sensor substrate 20 includes a sensor part 21 having a nearly rectangular planar shape provided above the first recess part 11 of the base substrate 10, a frame part 22 having a frame shape surrounding the sensor part 21, and a pair of support parts 23a, 23b having beam shapes connecting the sensor part 21 and the frame part 22. Note that the frame part 22 is unnecessary when the support parts 23a, 23b are bonded to the base substrate 10 for reliable support of the sensor part 21.

The sensor part 21 is swingably supported in the depth direction (Z-axis direction) of the first recess part 11 by the support parts 23a, 23b. Specifically, the sensor part 21 is rotatably supported like a seesaw in the Z-axis direction by torsion of the support parts 23a, 23b within an elastic deformation range (torsion spring action) around an axis line B passing through the support parts 23a, 23b.

The sensor part 21 is sectioned by the support parts 23a, 23b (axis line B) into a first part 21A at the −X side and a second part 21B at the +X side.

The sensor part 21 has a movable electrode part at the side opposed to the first recess part 11 of the base substrate 10 of the first part 21A and the second part 21B.

In the sensor part 21, masses are different between the first part 21A and the second part 21B. Specifically, the second part 21B is formed longer in length in the X-axis direction than the first part 21A. Further, through holes 24 penetrating in the Z-axis direction are formed at least at the end side in the second part 21B having the larger mass than that of the first part 21A. Note that, in the embodiment, the through holes 24 are formed in the entire range of the sensor part 21.

The through holes 24 are formed in strip shapes (elongated rectangular shapes) extending in the extension direction (Y-axis direction) of the support parts 23a, 23b. The plural through holes 24 are arranged in the X-axis direction as the width direction of the strips.

It is preferable that a semiconductor material such as low-resistance silicon is used for the sensor substrate 20.

Thereby, in the acceleration sensor 1, the movable electrode part and the sensor part 21 are integrated (the entire sensor part 21 is the movable electrode part).

The base substrate 10 has fixed electrode parts 12, 13 in positions opposed to the movable electrode part of the first part 21A and the second part 21B of the sensor part 21 in the first recess part 11. The fixed electrode parts 12, 13 have nearly rectangular planar shapes and equal areas to each other, and have line symmetric shapes with respect to the support parts 23a, 23b (axis line B) in the plan view.

Note that the plural through holes 24 of the sensor part 21 are arranged in line symmetric shapes with respect to the support parts 23a, 23b (axis line B) in the plan view in parts opposed to the fixed electrode parts 12, 13. Thereby, the acceleration sensor 1 is adapted so that the opposed areas of the movable electrode part and the fixed electrode parts 12, 13 may be equal in the first part 21A and the second part 21B of the sensor part 21.

On the base substrate 10, a second recess part 14 having a nearly rectangular planar shape is provided in contact with the first recess part 11 in a part nearer the end (+X direction) of the second part 21B of the sensor part 21 than the fixed electrode part 13 and opposed to the end side of the second part 21B of the sensor part 21.

Here, a depth D2 from the principal surface 10a to a bottom surface 14a of the second recess part 14 is deeper than a depth D1 from the principal surface 10a to a bottom surface 11a of the first recess part 11 (D2>D1).

A conducting part 15 having a nearly rectangular planar shape is provided on the bottom surface 14a of the second recess part 14, and the conducting part 15 is connected to the movable electrode part of the sensor part 21 via wiring (not shown) (also connected to the frame part 22 of the sensor substrate 20 connected to the movable electrode part). Note that the conducting part 15 and the fixed electrode parts 12, 13 are electrically independently formed from each other.

Figure 5A:
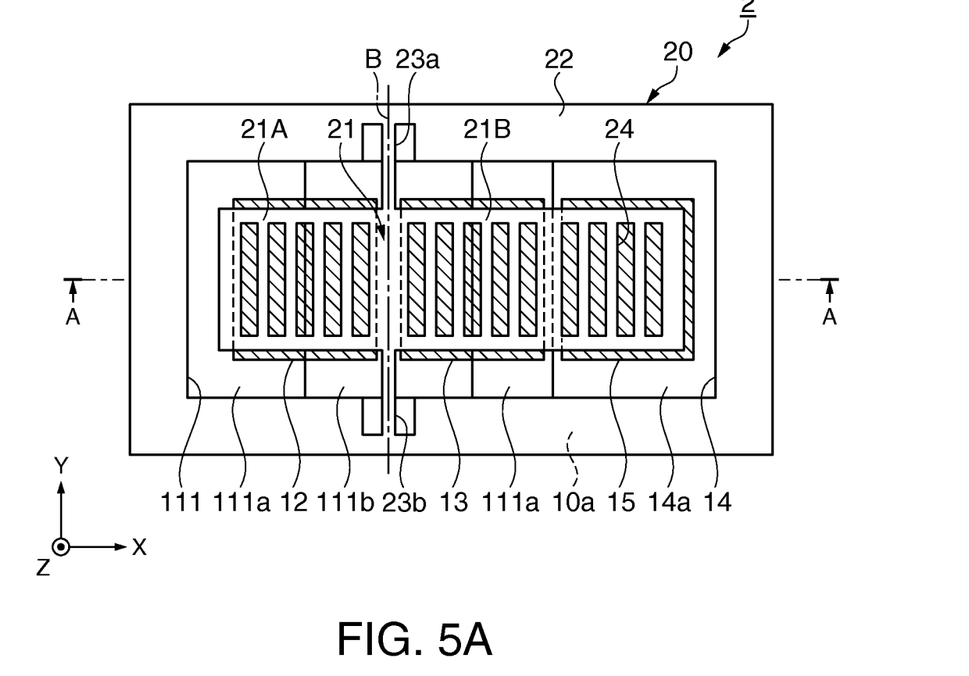

In FIGS. 1, 2A, and FIG. 5A, which will be described later, the fixed electrode parts 12, 13 and the conducting part 15 are hatched for convenience of explanation.

Constituent materials of the fixed electrode parts 12, 13 and the conducting part 15 are not particularly limited as long as they have conductivity, but various electrode materials may be used. Specifically, for example, oxides (transparent electrode materials) such as ITO (Indium Tin Oxide), IZO (Indium Zinc Oxide), $In_3O_3$, $SnO_2$, Sb-containing $SnO_2$, and Al-containing ZnO, Au, Pt, Ag, Cu, Al or alloys containing the metals, etc. are cited, and one or more of them may be combined for use.

A forming method (depositing method) of the fixed electrode parts 12, 13 and the conducting part 15 is not particularly limited, but, for example, vacuum evaporation, sputtering (low-temperature sputtering), dry plating such as ion plating, wet plating such as electrolytic plating or non-electrolytic plating, thermal spraying, thin-film bonding, or the like may be cited.

For shape formation of the base substrate 10 and the sensor substrate 20, technologies of photolithography and etching are used, and, by performing vertical etching using reactive ion etching (RIE) or the like, for example, inner wall surfaces of the first recess part 11 and the second recess part 14 of the base substrate 10, side surfaces of the sensor part 21, and inner surfaces of the through holes 24 are formed to be perpendicular to a principal surface of the sensor part 21.

As the reactive ion etching, for example, a processing method using an etching device including inductively coupled plasma (ICP) may be used.

In the acceleration sensor 1, glass containing alkali metal ions (movable ions) (for example, borosilicate glass such as Pyrex (registered trademark) glass) is used for the base substrate 10 and a silicon material is used for the sensor substrate 20, and thereby, they may be bonded by anodic bonding (a method of bringing the base substrate 10 and the sensor substrate 20 into close contact, applying a voltage of about 1 KV under a temperature of about 400° C., generating an electrostatic attractive force near a boundary face between them, and bonding them by covalent bonding).

Here, an operation of the acceleration sensor 1 will be explained.

Figure 3:
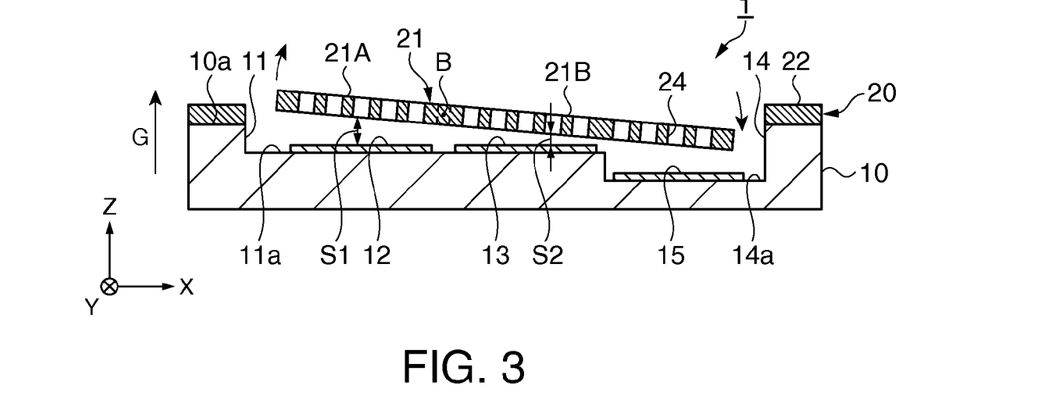
FIG. 3 is a schematic sectional view for explanation of an operation of the acceleration sensor.

FIG. 3 is a schematic sectional view for explanation of the operation of the acceleration sensor showing a state in which acceleration as a physical quantity is applied in the Z-axis direction.

As shown in FIG. 3, in the acceleration sensor 1, for example, when acceleration G is applied in the +Z-axis direction orthogonal to the principal surface of the sensor part 21, the sensor part 21 rotates like a seesaw around the axis line B due to inertia force and tilts with respect to the base substrate 10.

Specifically, in the acceleration sensor 1, the first part 21A of the sensor part 21 moves away from the fixed electrode part 12 and the second part 21B of the sensor part 21 moves closer to the fixed electrode part 13.

In this regard, an air gap S1 between the fixed electrode part 12 and the first part 21A (movable electrode part) of the sensor part 21 becomes larger and an air gap S2 between the fixed electrode part 13 and the second part 21B (movable electrode part) of the sensor part 21 becomes smaller, and thus, the electrostatic capacitance between the first part 21A and the fixed electrode part 12 becomes smaller and the electrostatic capacitance between the second part 21B and the fixed electrode part 13 becomes larger.

Therefore, in the acceleration sensor 1, by obtaining a voltage waveform by C-V conversion from the difference (differential capacitance) between the electrostatic capacitance generated in the air gap S1 between the first part 21A of the sensor part 21 and the fixed electrode part 12 and the electrostatic capacitance generated in the air gap S2 between the second part 21B of the sensor part 21 and the fixed electrode part 13, the acceleration applied to the acceleration sensor 1 may be detected.

In this regard, when the sensor part 21 rotates, internal spaces of the plural through holes 24 of the sensor part 21 respectively serve as channels for a gas (for example, the air or an inert gas such as nitrogen, helium, or argon) existing in the air gap S1 or the air gap S2 to flow.

Thereby, when the sensor part 21 rotates, the acceleration sensor 1 may let the gas existing in the air gap S1 or the air gap S2 out through the plural through holes 24.

In addition, in the acceleration sensor 1, the second recess part 14 deeper than the first recess part 11 is provided in the part nearer the end (+X direction) of the second part 21B of the sensor part 21 than the fixed electrode part 13 in the base substrate 10 and opposed to the end side of the second part 21B of the sensor part 21.

Thereby, in the acceleration sensor 1, when the sensor part 21 rotates, the degree of compression of a gas existing between the end side of the second part 21B of the sensor part 21 and the bottom surface 14a of the second recess part 14 is relaxed (becomes lower) compared to the case without the second recess part 14 (the case with the first recess part 11 only).

Accordingly, in the acceleration sensor 1, the flow resistance of the gas existing between the end side of the second part 21B of the sensor part 21 and the bottom surface 14a of the second recess part 14 is reduced.

As a result, in the acceleration sensor 1, displacement (rotation) of the sensor part 21 by application of acceleration becomes smoother.

As described above, in the acceleration sensor 1 of the first embodiment, the through holes 24 are formed at least at the end side of the second part 21B of the sensor part 21, and the second recess part 14 deeper than the first recess part 11 is provided in the part opposed to the end side of the second part 21B of the sensor part 21 in the base substrate 10.

Thereby, in the acceleration sensor 1, for example, when the second part 21B of the sensor part 21 is displaced around the rotation center of the support parts 23a, 23b (axis line B) due to the inertia force of the applied acceleration, the flow resistance of a gas existing between the second part 21B of the sensor part 21 and the bottom surface 11a of the first recess part 11 and the bottom surface 14a of the second recess part 14 is reduced compared to the case without the through holes 24 or the second recess part 14.

As a result, in the acceleration sensor 1, the displacement of the sensor part 21 by application of acceleration becomes smoother, and thus, the detection range of the acceleration may be made broader.

Further, in the acceleration sensor 1, the mass of the second part 21B of the sensor part 21 is larger (heavier) than that of the first part 21A, and thus, the sensor part 21 is not balanced between the first part 21A and the second part 21B, and the sensor part 21 may be efficiently rotated in response to the acceleration applied to the sensor part 21.

As a result, in the acceleration sensor 1, the detection sensitivity at application of acceleration may be further improved.

Furthermore, in the acceleration sensor 1, the through holes 24 of the sensor part 21 are formed in strip shapes (elongated rectangular shapes) extending in the extension direction (Y-axis direction) of the support parts 23a, 23b and the plural through holes 24 are arranged in the width direction (X-axis direction) of the strips, and thus, compared to other shapes, the internal spaces of the respective through holes 24 may be made larger while the mass of the sensor part 21 is secured.

As a result, in the acceleration sensor 1, when the sensor part 21 rotates, the flow resistance of the gas existing between the second part 21B of the sensor part 21 and the bottom surface 11a of the first recess part 11 and the bottom surface 14a of the second recess part 14 may be further reduced.

Therefore, in the acceleration sensor 1, the displacement of the sensor part 21 by application of acceleration becomes even smoother, and thus, the detection range of the acceleration may be further improved.

In addition, in the acceleration sensor 1, the conducting part 15 is provided within the second recess part 14 and the conducting part 15 and the movable electrode part (the frame part 22 of the sensor substrate 20 connected to the movable electrode part) are connected, and thus, for example, charge generated when the sensor substrate 20 including the sensor part 21 is processed by reactive ion etching or the like may be let out from the base substrate 10 side to the sensor substrate 20 side via the conducting part 15.

As a result, in the acceleration sensor 1, sticking of the sensor part 21 to the base substrate 10 due to charging may be avoided.

Figure 4A:
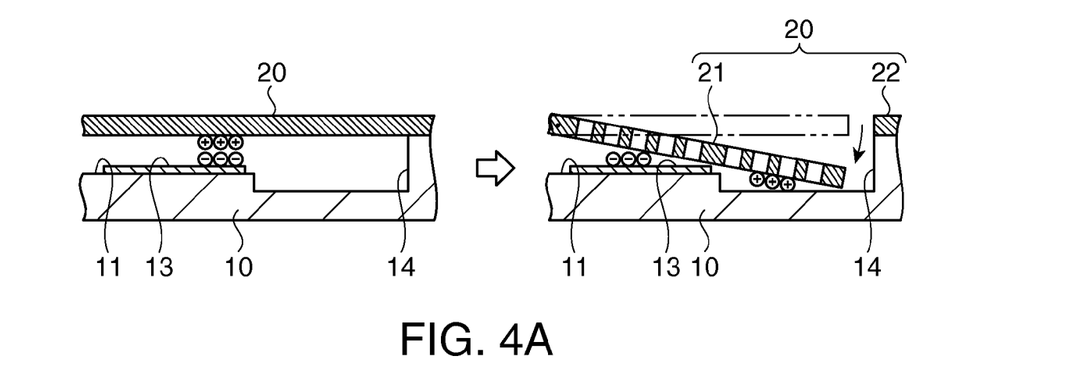
FIG. 4A is a sectional view showing the case without a conducting part and FIG. 4B is a sectional view showing the case with the conducting part.
Figure 4B:
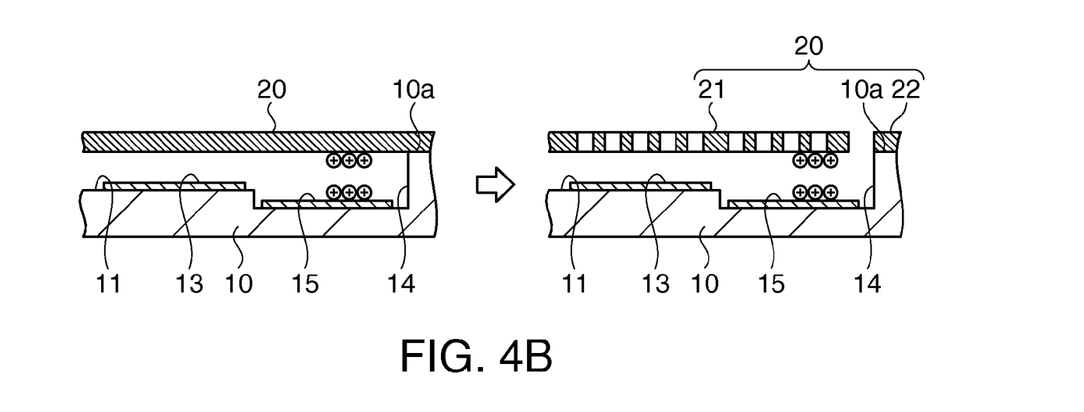

Here, using the drawings, sticking of the sensor part 21 will be described in detail. FIGS. 4A and 4B are schematic sectional views for explanation of sticking of the sensor part, and FIG. 4A is a sectional view showing the case without a conducting part and FIG. 4B is a sectional view showing the case with the conducting part as in the embodiment.

As shown in FIG. 4A, in the case where the conducting part 15 is not provided on the base substrate 10, when the sensor part 21 is formed by processing the sensor substrate 20 using silicon by reactive ion etching or the like, charge is accumulated at the base substrate side and a potential difference is generated between the sensor part 21 and the base substrate 10. Thereby, without the conducting part 15, the sensor part 21 may stick to the base substrate 10.

On the other hand, as shown in FIG. 4B, in the embodiment, the sensor part 21 is formed by reactive ion etching or the like under the condition that the conducting part 15 provided within the second recess part 14 of the base substrate 10 and the sensor substrate 20 are electrically connected to each other (specifically, the wiring extending from the conducting part 15 to the principal surface 10a is in contact with the part to be the frame part 22 of the sensor substrate 20).

Thereby, in the embodiment, the charge generated at reactive ion etching may be let out from the base substrate 10 side to the sensor substrate 20 side via the conducting part 15.

As a result, in the embodiment, charge accumulation at reactive ion etching may be reduced and, when the sensor part 21 is formed, the sensor part 21 and the base substrate 10 (conducting part 15) are at the same potential and sticking of the sensor part 21 to the base substrate 10 may be avoided.

Further, in the acceleration sensor 1, the glass such as borosilicate glass is used for the base substrate 10 and the semiconductor material such as silicon is used for the sensor part 21, and thus, insulation and isolation between the base substrate 10 and the sensor part 21 may be easily performed by the glass having an insulation property.

In addition, in the acceleration sensor 1, by using the low-resistance silicon as the semiconductor material for the sensor part 21, the sensor part 21 and the movable electrode part may be integrated.

Thereby, in the acceleration sensor 1, the movable electrode part may be easily provided in the sensor part 21.

Second Embodiment

Next, an acceleration sensor according to a second embodiment will be explained. In the acceleration sensor of the second embodiment, the above described first recess part of the acceleration sensor of the first embodiment is formed in a step-like shape.

Figure 5B:
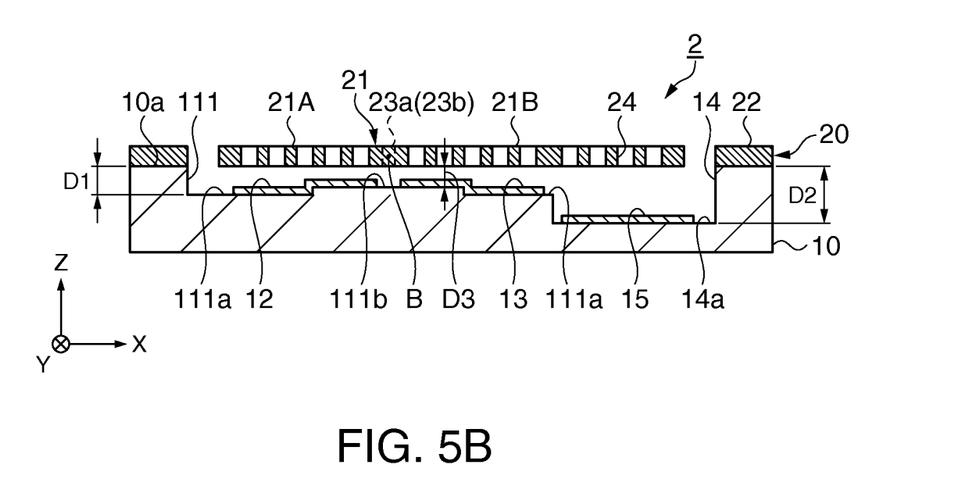

FIGS. 5A and 5B are schematic plan and sectional views showing a general configuration of the acceleration sensor of the second embodiment, and FIG. 5A is a plan view and FIG. 5B is a sectional view along an A-A line in FIG. 5A. Note that the parts in common with the first embodiment have the same signs and their detailed explanation will be omitted and the parts different from the first embodiment will be centered for explanation.

As shown in FIGS. 5A and 5B, in an acceleration sensor 2, a first recess part 111 of the base substrate 10 is formed in a step-like shape so that an air gap between the sensor part 21 and itself may be larger from the support parts 23a, 23b (axis line B) side of the sensor part 21 toward the end side.

Specifically, in the acceleration sensor 2, a bottom surface 111a and a bottom surface 111b of the first recess part 111 are formed to have a difference in level so that an air gap between the bottom surface 111b of the first recess part 111 and the sensor part 21 at the support parts 23a, 23b (axis line B) side may be smaller than an air gap between the bottom surface 111a of the first recess part 111 and the sensor part 21 at the end side.

In other words, in the acceleration sensor 2, a depth D3 from the principal surface 10a of the base substrate 10 to the bottom surface 111b of the first recess part 111 is shallower than the depth D1 from the principal surface 10a of the base substrate 10 to the bottom surface 111a of the first recess part 111 (D3<D1).

Accordingly, in the acceleration sensor 2, at the support parts 23a, 23b side with the smaller displacement of the sensor part 21 rotating like a seesaw, the air gap (D3) between the bottom surface 111b of the first recess part 111 and the sensor part 21 may be made smaller and, at the end side with the larger displacement of the sensor part 21, the air gap (D1) between the bottom surface 111a of the first recess part 111 and the sensor part 21 may be made larger.

As a result, in the acceleration sensor 2, the electrostatic capacitances between the sensor part 21 (movable electrode part) and the fixed electrode parts 12, 13 may be made larger than in the case where the bottom surface 111b of the first recess part 111 is formed by a flat surface (bottom surface 111a) with reference to the air gap (D1) between the end side with the larger displacement of the sensor part 21 and itself (D3=D1), and thus, compared to the first embodiment, the detection sensitivity may be further improved.

Note that, in FIGS. 5A and 5B, the fixed electrode parts 12, 13 are integrally provided respectively from the bottom surface 111a to the bottom surface 111b, however, they may be divisionally provided into parts of the bottom surface 111a and parts of the bottom surface 111b.

Thereby, in the acceleration sensor 2, detection errors of the electrostatic capacitances in the step parts that may occur in the case where the fixed electrode parts 12, 13 are respectively integrated may be avoided, and thus, changes in the electrostatic capacitance may be detected with high accuracy.

Note that the first recess part 111 of the base substrate 10 may be formed in a slope shape in place of the step-like shape, and may exert the same effects as those described above.

Third Embodiment

Next, an electronic apparatus including the acceleration sensors of the respective embodiments according to a third embodiment will be explained.

Figure 6:
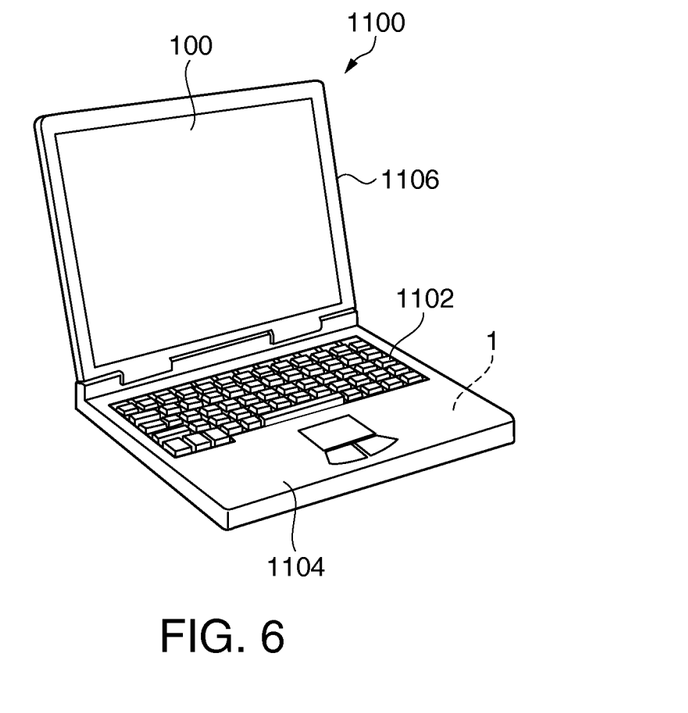
FIG. 6 is a perspective view of an electronic apparatus (notebook personal computer) including the acceleration sensor.

FIG. 6 is a perspective view showing a configuration of a mobile (or notebook) personal computer as an electronic apparatus including the acceleration sensor.

As shown in FIG. 6, a personal computer 1100 includes a main body unit 1104 having a keyboard 1102 and a display unit 1106 having a display part 100, and the display unit 1106 is rotatably supported via a hinge structure part with respect to the main body unit 1104.

The personal computer 1100 contains the acceleration sensor 1.

Note that the personal computer 1100 may contain the acceleration sensor 2 in place of the acceleration sensor 1.

Figure 7:
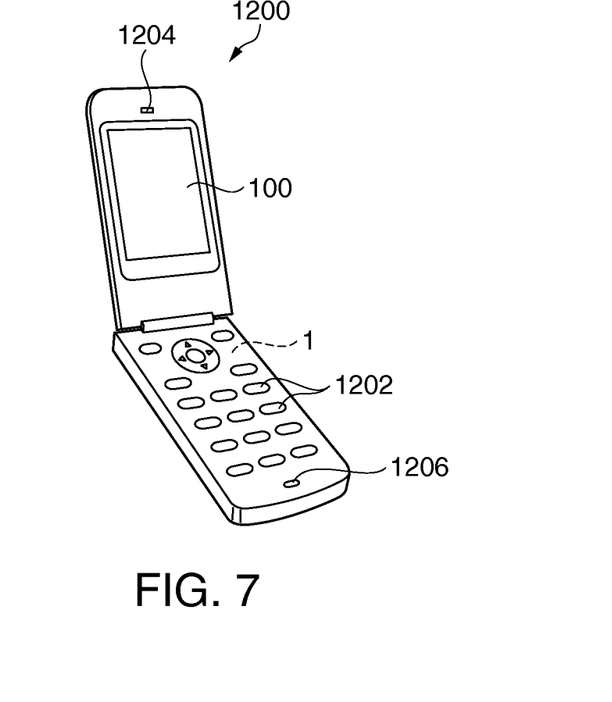
FIG. 7 is a perspective view of an electronic apparatus (cellular phone) including the acceleration sensor.

FIG. 7 is a perspective view showing a configuration of a cellular phone (including PHS) as an electronic apparatus including the acceleration sensor.

As shown in FIG. 7, a cellular phone 1200 includes plural operation buttons 1202, an ear piece 1204, and a mouthpiece 1206, and a display part 100 is provided between the operation buttons 1202 and the ear piece 1204.

The cellular phone 1200 contains the acceleration sensor 1.

Note that the cellular phone 1200 may contain the acceleration sensor 2 in place of the acceleration sensor 1.

Figure 8:
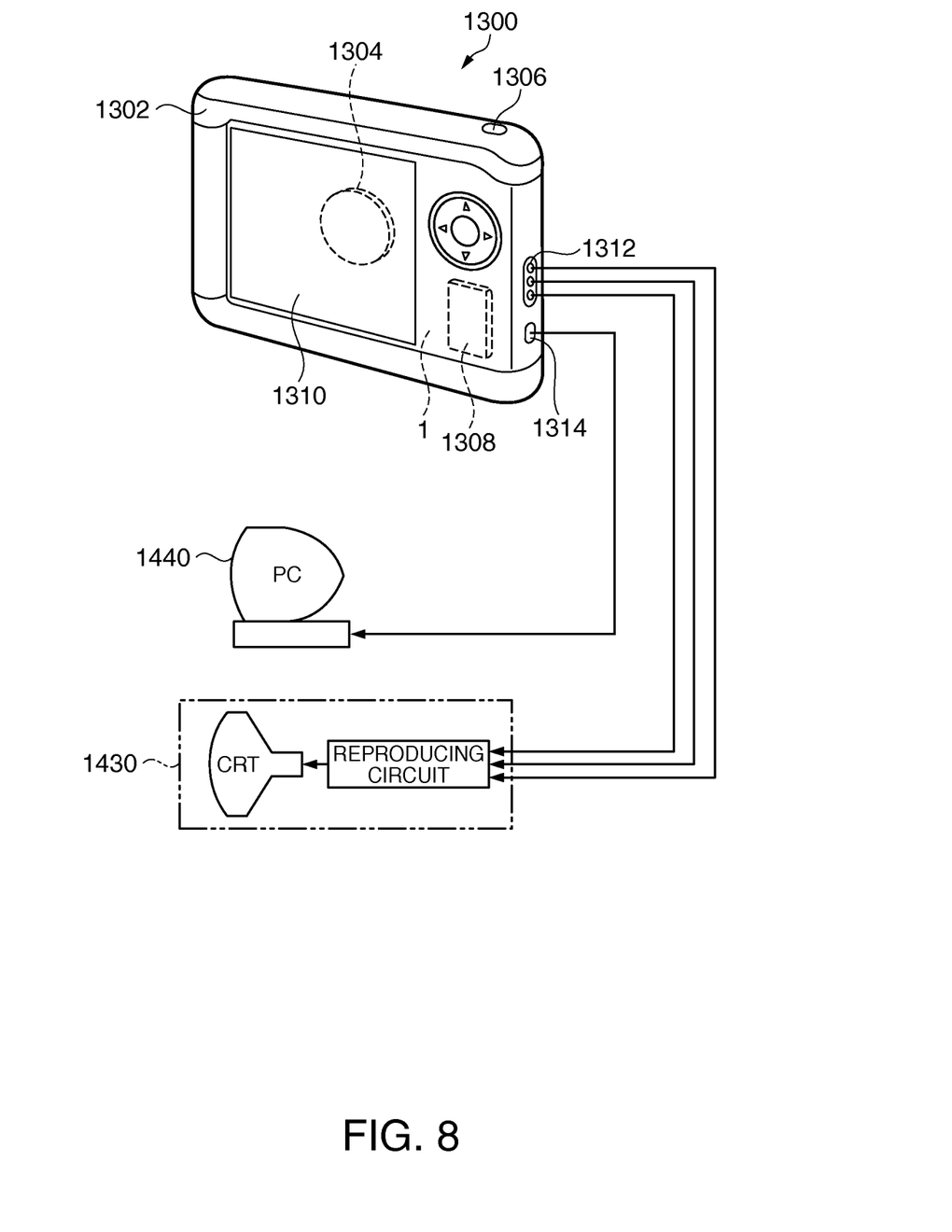
FIG. 8 is a perspective view of an electronic apparatus (digital still camera) including the acceleration sensor.

FIG. 8 is a perspective view showing a configuration of a digital still camera as an electronic apparatus including the acceleration sensor. In FIG. 8, also connection to an external device is simply shown.

Here, in a typical camera, a silver halide photographic film is exposed to light by an optical image of a subject, on the other hand, a digital still camera 1300 photoelectrically converts an optical image of a subject using an image sensing device such as a CCD (Charge Coupled Device) and generates imaging signals (image signals).

On a back surface (on the front side in the drawing) of a case (body) 1302 in the digital still camera 1300, a display part 1310 is provided and adapted to display based on the imaging signals by the CCD, and the display part 1310 functions as a finder that displays the subject as an electronic image.

Further, on the front side (the back side in the drawing) of the case 1302, a light receiving unit 1304 including an optical lens (imaging system), the CCD, etc. is provided.

When a photographer checks a subject image displayed on the display part 1310 and presses down a shutter button 1306, the imaging signals of the CCD at the time are transferred and stored in a memory 1308.

Further, in the digital still camera 1300, a video signal output terminal 1312 and an input/output terminal for data communication 1314 are provided on a side surface of the case 1302. Furthermore, a television monitor 1430 is connected to the video signal output terminal 1312 and a personal computer 1440 is connected to the input/output terminal for data communication 1314, respectively, according to need. In addition, by predetermined operation, the imaging signals stored in the memory 1308 are output to the television monitor 1430 and the personal computer 1440.

The digital still camera 1300 contains the acceleration sensor 1.

Note that the digital still camera 1300 may contain the acceleration sensor 2 in place of the acceleration sensor 1.

The electronic apparatus having the configuration includes the acceleration sensor 1 or the acceleration sensor 2, and thus, may be an advantageous electronic apparatus that exerts the effects described in the respective embodiments.

The electronic apparatus including the acceleration sensor may be applied not only to the personal computer (mobile personal computer) in FIG. 6, the cellular phone in FIG. 7, and the digital still camera in FIG. 8 but also to an inkjet ejection device (for example, an inkjet printer), a laptop personal computer, a television, a video camera, a video tape recorder, various navigation systems, a pager, a personal digital assistance (with or without communication function), an electronic dictionary, a calculator, an electronic game machine, a word processor, a work station, a videophone, a security television monitor, electronic binoculars, a POS terminal, medical devices (for example, an electronic thermometer, a sphygmomanometer, a blood glucose meter, an electrocardiographic measurement system, an ultrasonic diagnostic system, an electronic endoscope), a fish finder, various measurement instruments, meters and gauges (for example, meters for vehicles, airplanes, and ships), a flight simulator, etc.

The entire disclosure of Japanese Patent Application No. 2011-178252, filed Aug. 17, 2011 is expressly incorporated by reference herein.

What is claimed is:

1. A physical quantity sensor comprising:
   a base substrate provided with a first recess having a first bottom surface, a second recess having a second bottom surface and a third recess having a third bottom surface, the first and second bottom surfaces being continuously provided via a first step, the first and third bottom surfaces being continuously provided via a second step, the second bottom surface being deeper than the first bottom surface, the third bottom surface being deeper than the second bottom surface; and
   a sensor substrate that is located above the base substrate by way of the first through third recesses, the sensor substrate includes:
     a peripheral frame contacting the base substrate;
     a sensor that is circumscribed by the peripheral frame in a plan view, the sensor being movably supported by the peripheral frame; and
     a support that connects the sensor to the peripheral frame,
   wherein the sensor is sectioned into a first part and a second part by the support, includes first and second movable electrodes in the first part and the second part, respectively, the second part is larger in mass than the first part, and a through hole is provided at least in one of the first part and the second part, and
   the base substrate includes a first fixed electrode in a first position overlapping with the first movable electrode in the plan view, and the first fixed electrode is continuously provided on part of the first and second bottom surfaces and the first step, and
   the base substrate include a second fixed electrode in a second position overlapping with the second movable electrode in the plan view, and the second fixed electrode is continuously provided on part of the first and third bottom surfaces and the second step.

2. The physical quantity sensor according to claim 1, wherein a conducting part is provided on the third bottom surface within the third recess, and
   the conducting part is connected to the first and second movable electrodes.

3. The physical quantity sensor according to claim 1, wherein a plurality of through holes are provided along an extending direction of the support.

4. The physical quantity sensor according to claim 1, wherein an insulating material is used for the base substrate, and
   a semiconductor material is used for the sensor substrate.

5. An electronic apparatus comprising the physical quantity sensor according to claim 1.

6. A physical quantity sensor comprising:
   a base substrate provided with a first recess having a first bottom surface, a second recess having a second bottom surface and a third recess having a third bottom surface, the first and second bottom surfaces being continuously provided via a first step, the first and third bottom surfaces being continuously provided via a second step, the second bottom surface being deeper than the first bottom surface, the third bottom surface being deeper than the second bottom surface; and
   a sensor substrate that is located above the base substrate by way of the first through third recesses, the sensor substrate includes:
     a peripheral frame contacting the base substrate;
     a sensor that is circumscribed by the peripheral frame in a plan view, the sensor being movably supported by the peripheral frame; and
     a support that connects the sensor to the peripheral frame, wherein
   the sensor is sectioned into a first part and a second part by the support, includes first and second movable electrodes in the first part and the second part, respectively, the second part is larger in mass than the first part, and a through hole is provided at least in one of the first part and the second part,
   the base substrate includes a first fixed electrode in a first position overlapping with the first movable electrode in the plan view, and the first fixed electrode is continuously provided on part of the first and second bottom surfaces and the first step,
   the base substrate includes a second fixed electrode in a second position overlapping with the second movable electrode in the plan view, and the second fixed electrode is continuously provided on part of the first and third bottom surfaces and the second step,
   a first air gap is formed between the first bottom surface and a border between the first part and the second part,
   a second air gap is formed between the second bottom surface and an end of the first part,
   a third air part is formed between the third bottom surface and an end of the second part, and
   the first air gap is smaller than the second air gap, and the second air gap is smaller than the third air gap.

* * * * *